(12) United States Patent
Drews et al.

(10) Patent No.: US 8,768,893 B2
(45) Date of Patent: *Jul. 1, 2014

(54) IDENTIFYING COMPUTER USERS HAVING FILES WITH COMMON ATTRIBUTES

(75) Inventors: Clemens Drews, San Jose, CA (US); Tessa Ann Lau, Mountain View, CA (US); James Lin, Cupertino, CA (US); John C. Tang, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/296,431

(22) Filed: Nov. 15, 2011

(65) Prior Publication Data

US 2012/0059830 A1 Mar. 8, 2012

Related U.S. Application Data

(63) Continuation of application No. 12/130,339, filed on May 30, 2008, now Pat. No. 8,086,573, which is a continuation of application No. 11/562,084, filed on Nov. 21, 2006, now abandoned.

(51) Int. Cl.
*G06F 17/30* (2006.01)
(52) U.S. Cl.
USPC .......................................... 707/687
(58) Field of Classification Search
None
See application file for complete search history.

(56) References Cited

U.S. PATENT DOCUMENTS

| | | | |
|---|---|---|---|
| 5,806,073 A | 9/1998 | Piaton | |
| 6,088,707 A | 7/2000 | Bates et al. | |
| 6,098,079 A | 8/2000 | Howard | |
| 6,347,313 B1 | 2/2002 | Ma et al. | |
| 6,571,234 B1 | 5/2003 | Knight et al. | |
| 6,606,639 B2 | 8/2003 | Jacobson et al. | |
| 6,640,225 B1 | 10/2003 | Takishita et al. | |
| 2002/0049760 A1 | 4/2002 | Scott et al. | |
| 2003/0037051 A1 | 2/2003 | Gruenwald | |
| 2003/0046281 A1 | 3/2003 | Son | |
| 2004/0210582 A1 | 10/2004 | Chatterjee et al. | |
| 2005/0055327 A1 | 3/2005 | Agrawal et al. | |
| 2005/0131939 A1 | 6/2005 | Douglis et al. | |
| 2005/0210465 A1 | 9/2005 | Sasaki et al. | |
| 2006/0004820 A1* | 1/2006 | Claudatos et al. | 707/101 |
| 2006/0036640 A1 | 2/2006 | Tateno et al. | |
| 2006/0212441 A1* | 9/2006 | Tang et al. | 707/5 |

* cited by examiner

*Primary Examiner* — Syed Hasan
(74) *Attorney, Agent, or Firm* — Cantor Colburn LLP; Yasuke Kanesha

(57) ABSTRACT

A method includes generating a first table having a set of attributes for each file in a first set of files associated with a first computer user. The set of attributes for each file in the first set of files have a plurality of attribute types. The method further includes generating a second table having a set of attributes for each file in a second set of files associated with a second computer user. The set of attributes for each file in the second set of files have the plurality of attribute types. The method further includes generating a similarity table by comparing each set of attributes in the first table with each set of attributes in the second table, utilizing a predetermined similarity metric, and determining whether the first and second computer users have at least one file with common attributes, based on data in the similarity table.

8 Claims, 7 Drawing Sheets

Similarity Table - (checksum) /70

| checksum | Users | Similarity | Comment |
|---|---|---|---|
| E02 | 1,2 | 1 | System Files |
| 323 | 1,2 | 1 | New app file 1 |
| F12 | 1,2 | 1 | File X, File D |
| E16 | 1,2 | 1 | File Y, File Y |
| 1E2 | 1,2 | 1 | File Z, File Z |
| A12 | 1,2 | 1 | File A |
| A15 | 1,2 | 1 | File B |
| 432 | 2 | 0 | New app file 2 |
| 123 | 2 | 0 | File H |
| XYZ | 2 | 0 | File C |
| A20 | 1 | 0 | File C |

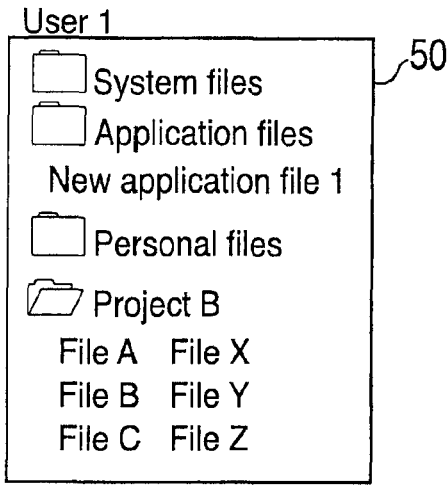

FIG. 2

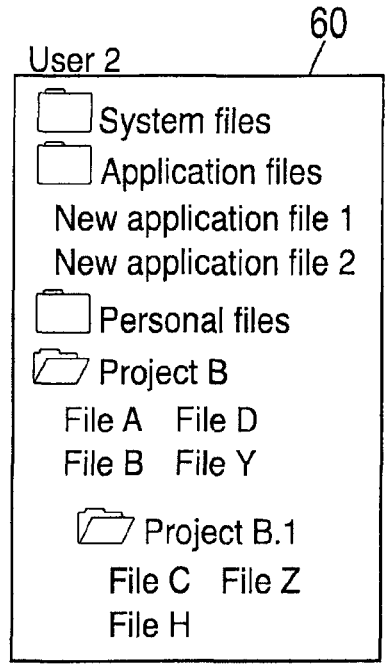

FIG. 4

| TABLE 1 (computer user 1) | | |
|---|---|---|
| User 1 | System files | E02 |
| User 1 | New app file 1 | 323 |
| User 1 | Personal files | |
| User 1 | Project B | |
| User 1 | File A | A12 |
| User 1 | File B | A15 |
| User 1 | File C | A20 |
| User 1 | File X | F12 |
| User 1 | File Y | E16 |
| User 1 | File Z | 1E2 |

FIG. 3

| TABLE 2 (computer user 2) | | |
|---|---|---|
| User 2 | System Files | E02 |
| User 2 | New app file 1 | 323 |
| User 2 | New app file 2 | 432 |
| User 2 | Personal files | |
| User 2 | Project B | |
| User 2 | File A | A12 |
| User 2 | File B | A15 |
| User 2 | File D | F12 |
| User 2 | File Y | E16 |
| User 2 | Project B,1 | |
| User 2 | File C | XYZ |
| User 2 | File H | 123 |
| User 2 | File Z | 1E2 |

FIG. 5

| Similarity Table - (checksum) | | | |
|---|---|---|---|
| checksum | Users | Similarity | Comment |
| E02 | 1,2 | 1 | System Files |
| 323 | 1,2 | 1 | New app file 1 |
| F12 | 1,2 | 1 | File X, File D |
| E16 | 1,2 | 1 | File Y, File Y |
| 1E2 | 1,2 | 1 | File Z, File Z |
| A12 | 1,2 | 1 | File A |
| A15 | 1,2 | 1 | File B |
| 432 | 2 | 0 | New app file 2 |
| 123 | 2 | 0 | File H |
| XYZ | 2 | 0 | File C |
| A20 | 1 | 0 | File C |

FIG. 6

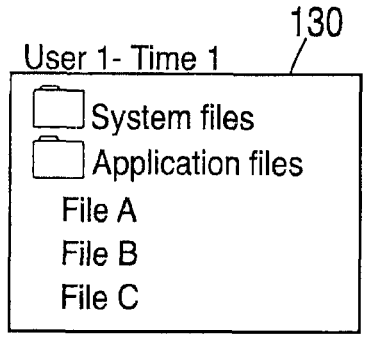

FIG. 8

| TABLE 3 (computer user 1) | | |
|---|---|---|
| User 1 | System files | C:\dir1 |
| User 1 | Application files | C:\dir2 |
| User 1 | File A | C:\ |
| User 1 | File B | C:\ |
| User 1 | File C | C:\ |

FIG. 9

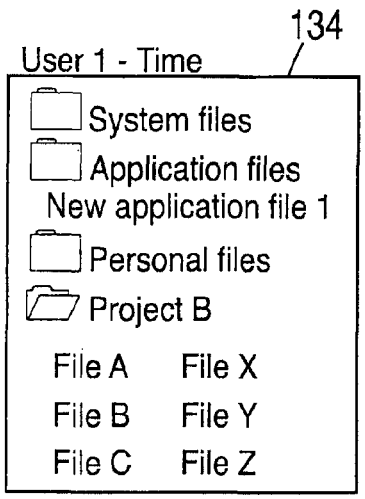

FIG. 10

| TABLE 4 (computer user 1) | | |
|---|---|---|
| User 1 | System files | C:\dir1 |
| User 1 | Application files | C:\dir2 |
| User 1 | New app file 1 | C:\dir2\Application files |
| User 1 | Personal files | C:\ |
| User 1 | Project B | C:\ |
| User 1 | File A | C:\Project B |
| User 1 | File B | C:\Project B |
| User 1 | File C | C:\Project B |
| User 1 | File X | C:\Project B |
| User 1 | File Y | C:\Project B |
| User 1 | File Z | C:\Project B |

FIG. 11

| TABLE 1 (computer user 1) | | |
|---|---|---|
| User 1 | New app file 1 | C:\dir2\Application files |
| User 1 | Personal files | C:\ |
| User 1 | Project B | C:\ |
| User 1 | File A | C:\Project B |
| User 1 | File B | C:\Project B |
| User 1 | File C | C:\Project B |
| User 1 | File X | C:\Project B |
| User 1 | File Y | C:\Project B |
| User 1 | File Z | C:\Project B |

FIG. 12

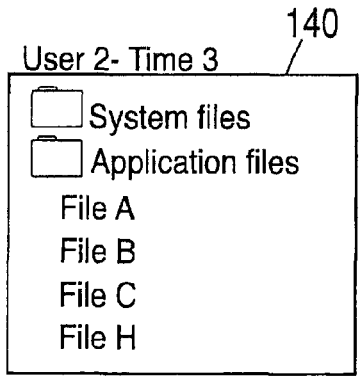

FIG. 13

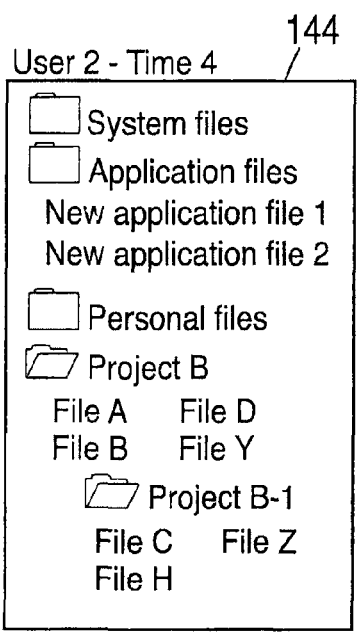

FIG. 15

TABLE 5 (computer user 2) 142

| User 2 | System files | C:\dir1 |
|---|---|---|
| User 2 | Application files | C:\dir2 |
| User 2 | File A | C:\ |
| User 2 | File B | C:\ |
| User 2 | File C | C:\ |
| User 2 | File H | C:\ |

FIG. 14

TABLE 6 (computer user 2) 146

| User 2 | System files | C:\dir1 |
|---|---|---|
| User 2 | Application files | C:\dir2 |
| User 2 | New app file 1 | C:\dir2\Application files |
| User 2 | New app file 2 | C:\dir2\Application files |
| User 2 | Personal files | C:\ |
| User 2 | Project B | C:\ |
| User 2 | File A | C:\Project B |
| User 2 | File B | C:\Project B |
| User 2 | File D | C:\Project B |
| User 2 | File Y | C:\Project B |
| User 2 | Project B-1 | C:\Project B |
| User 2 | File C | C:\Project B\B-1 |
| User 2 | File H | C:\Project B\B-1 |
| User 2 | File Z | C:\Project B\B-1 |

FIG. 16

TABLE 2 (computer user 2) 148

| User 2 | New app file 1 | C:\dir2\Application files |
|---|---|---|
| User 2 | New app file 2 | C:\dir2\Application files |
| User 2 | Personal files | C:\ |
| User 2 | Project B | C:\ |
| User 2 | File A | C:\Project B |
| User 2 | File B | C:\Project B |
| User 2 | File D | C:\Project B |
| User 2 | File Y | C:\Project B |
| User 2 | Project B-1 | C:\Project B |
| User 2 | File C | C:\Project B\B-1 |
| User 2 | File H | C:\Project B\B-1 |
| User 2 | File Z | C:\Project B\B-1 |

FIG. 17

| Similarity Table - (file location) | | | |
|---|---|---|---|
| File | Location | Users | Similarity |
| New app file 1 | C:\dir2\Application files | 1,2 | 10 |
| Project B | C:\ | 1,2 | 10 |
| File A | C:\Project B | 1,2 | 10 |
| File B | C:\Project B | 1,2 | 10 |
| File C | C:\Project B, C:\Project B\Project B-1 | 1,2 | 5 |
| File X | C:\Project B | 1 | 0 |
| File Y | C:\Project B | 1,2 | 10 |
| File Z | C:\Project B, C:\Project B\Project B-1 | 1,2 | 5 |
| File D | C:\Project B | 2 | 0 |
| New app file 2 | C:\dir2\Application files | 2 | 0 |
| Project B-1 | C:\Project B | 2 | 0 |
| File H | C:\Project B\Project B-1 | 2 | 0 |

FIG. 18

User enters Search term = "File A"

FIG. 19

| Results 1 | Results 2 |
|---|---|
| File X<br>File Y<br>File Z | User2 |

FIG. 20

IDENTIFYING COMPUTER USERS HAVING FILES WITH COMMON ATTRIBUTES

CROSS-REFERENCES TO RELATED APPLICATIONS

This application is a continuation of application Ser. No. 12/130, 339, filed May 30, 2008, which is a continuation of application Ser. No. 11/562,084, filed Nov. 21, 2006.

FIELD OF INVENTION

This application relates to a system and a method for identifying computer users having files with common attributes.

BACKGROUND

A growing problem in the realm of information technology is managing, organizing, finding, and making use of electronic data available within a business organization. Though data may exist within the business organization, it is often difficult to locate when needed. Consequently, much effort is employed to manage and organize information so that it may be easily found and used. Although search technologies have made it easier to find electronically available information if it has already been structured and organized for public browsing on the Internet, finding information within a private computer network (intranet) remains difficult. For example, searching an intranet gives limited results in part because content creators are insufficiently or improperly motivated to make their content "interesting" (i.e., rich with links to related documents), or attractive. Consequently, few viewers are in turn motivated to link to such content.

Moreover, intranet web pages are ideally designed to provide information organized in an efficient, hierarchical structure, and do not necessarily aim to connect information to other information. Consequently, for many intranet searches only one content page contains the sought-for data, and few (sometimes zero) links point to that intranet web page from other pages. Making an intranet search even more difficult, intranet files often lack identifying characteristics to make the files stand out in a particular search.

Furthermore, some data available in an intranet is not search-engine-friendly or was never intended to be viewed directly. For example, data may be stored in locations that can't easily be crawled by a "web spider", or data may be intended only to form a portion of a larger set of data.

Members of a business organization may wish to identify others in the organization having common interests and ideas, as suggested by their maintenance of identical or similar files. However, current search schemes generally provide results only for purposely published files.

Accordingly the inventors herein have recognized a need for an improved system and method for identifying computer users having files with common attributes.

BRIEF SUMMARY

A method for identifying computer users having files with common attributes in accordance with an exemplary embodiment is provided. The method includes generating a first table having a set of attributes for each file in a first set of files associated with a first computer user. The set of attributes for each file in the first set of files have a plurality of attribute types. The method further includes generating a second table having a set of attributes for each file in a second set of files associated with a second computer user. The set of attributes for each file in the second set of files have the plurality of attribute types. The method further includes generating a similarity table by comparing each set of attributes in the first table with each set of attributes in the second table, utilizing a predetermined similarity metric. The method further includes determining whether the first and second computer users have at least one file with common attributes, based on data in the similarity table.

A system for identifying computer users having files with common attributes in accordance with another exemplary embodiment is provided. The system includes first and second computers operably communicating with one another. The system further includes a display device operably communicating with the first computer. The first computer is configured to generate a first table having a set of attributes for each file in a first set of files associated with a first computer user. The set of attributes for each file in the first set of files have a plurality of attribute types. The second computer is further configured to generate a second table having a set of attributes for each file in a second set of files associated with a second computer user. The set of attributes for each file in the second set of files have the plurality of attribute types. The first computer is further configured to generate a similarity table by comparing each set of attributes in the first table with each set of attributes in the second table, utilizing a predetermined similarity metric. The first computer is further configured to determine whether the first and second computer users have at least one file with common attributes, based on data in the similarity table. The first computer is further configured to display a user identifier associated with at least one of the first and second computer users on the display device when the first and second computer users have at least one file with common attributes.

BRIEF DESCRIPTION OF THE SEVERAL VIEWS OF THE DRAWINGS

FIG. 2 is a schematic of a set of files associated with a computer user of the computer network of FIG. 1;

FIG. 3 is a schematic of a table of attributes associated with the set of files illustrated in FIG. 2;

FIG. 4 is a schematic of a set of files associated with a second computer user of the computer network of FIG. 1;

FIG. 5 is a schematic of a table of attributes associated with the set of files illustrated in FIG. 4;

FIG. 6 is a schematic of a similarity table derived from the tables of attributes in FIG. 3 and FIG. 5;

FIG. 8 is a schematic of an exemplary set of files associated with a computer user at an first time;

FIG. 9 is a schematic of a table of attributes associated with the set of files shown in FIG. 8;

FIG. 10 is a schematic of an exemplary set of files associated with the computer user of FIG. 8 at a time later than the first time;

FIG. 11 is a schematic of a table of attributes associated with the set of files shown in FIG. 10;

FIG. 12 is a schematic of a table having sets of attributes that are in the table of attributes of FIG. 11 and that are not in the table of attributes of FIG. 9;

FIG. 13 is a schematic of an exemplary set of files associated with a different computer user at a first time;

FIG. 14 is a schematic of a table of attributes associated with the set of files shown in FIG. 13;

FIG. 15 is a schematic of an exemplary set of files associated with the different computer user at a time later than the first time;

FIG. 16 is a schematic of a table of attributes associated with the set of files shown in FIG. 15;

FIG. 17 is a schematic of a table having sets of attributes that are in the table of attributes of FIG. 16 and that are not in the table of attributes of FIG. 14;

FIG. 18 is a schematic of a similarity table derived from the tables of attributes in FIG. 12 and FIG. 17;

FIG. 19 is a schematic of an exemplary search query entered by a search user in accordance with the similarity table of FIG. 6;

FIG. 20 is a schematic of an exemplary search result produced in accordance with the search query of FIG. 19.

DETAILED DESCRIPTION

Figure 1:
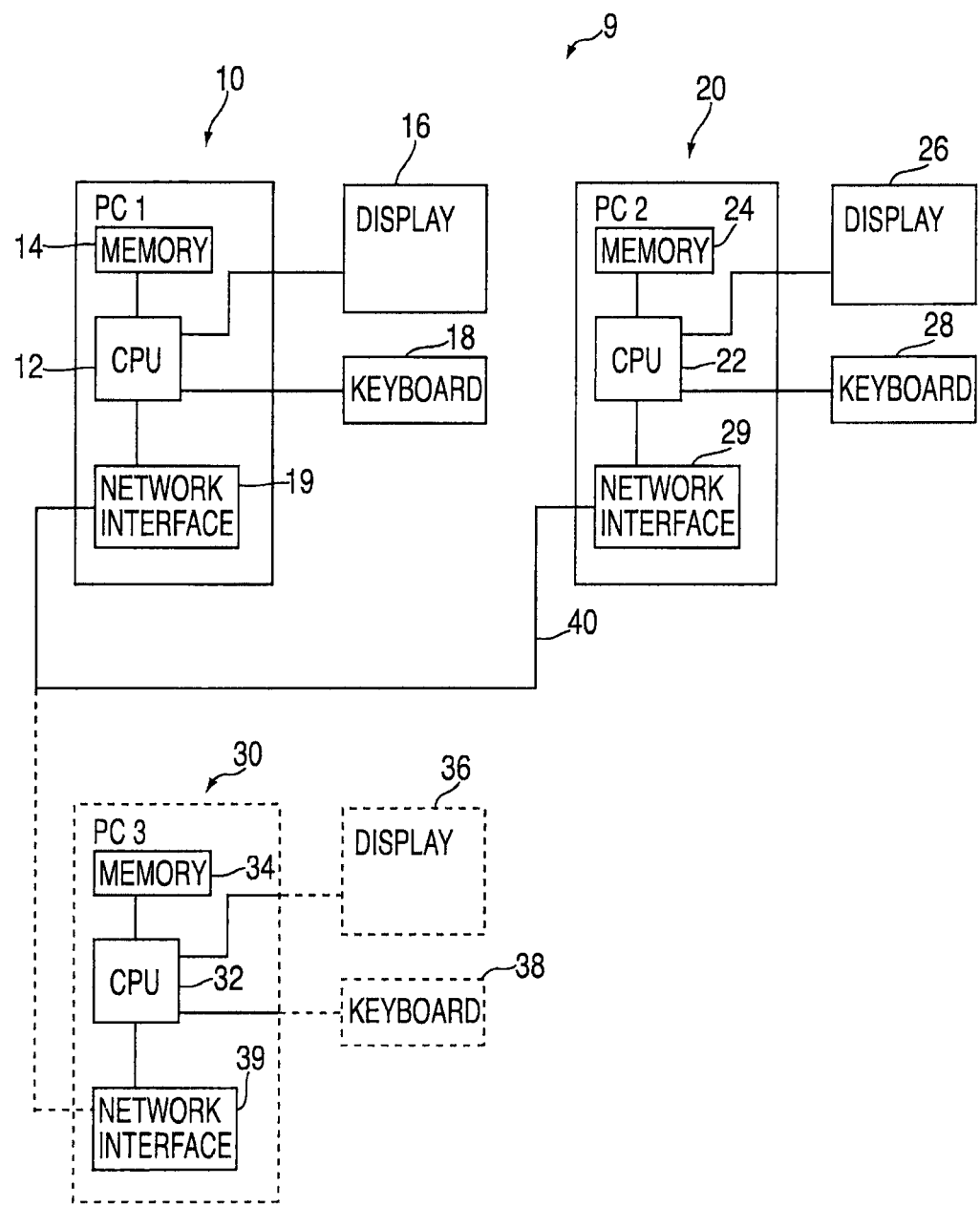
FIG. 1 is a block diagram of a computer network for identifying computer users having files with common attribute in accordance with an exemplary embodiment.

Referring to FIG. 1, a computer network 9 for allowing the identification of computer users having files with common attributes is illustrated. The computer network 9 includes a computer 10 associated with a first computer user and a computer 20 associated with a second computer user. In an exemplary embodiment, the computer network 9 comprises an Intranet which is a private network that uses Internet software and Internet standards. In the exemplary embodiment, the computers 10, 20 have at least central processing units 12, 22, data storage/RAM/ROM memory 14, 24, displays 16, 26, keyboards 18, 28, and network interfaces 19, 29, respectively. Computers 10 and 20 are in data communication with network medium 40. Network medium 40 may of course include one or more routers, switches, data hubs, or other data communication equipment, and may facilitate wired and/or wireless communication. Optionally, computer network 9 can further include additional computers, for example computer 30, which may be associated with additional computer users in the system. An additional computer such as computer 30 has at least a central processing unit 32, data storage/RAM/ROM memory 34, a display 36, a keyboard 38, and a network interface 39.

Referring to FIGS. 2-6, exemplary files and tables utilized the by the computer network 9 for allowing the identification of computer users having files with common attributes are illustrated. In particular, a set of files 50 associated with the first computer user is illustrated. A set of files 60, associated with the second computer user, is also illustrated. In the exemplary embodiment, the set of files 50 resides in memory 14 of computer 10, and set of files 60 resides in memory 24 of computer 20. It is, of course, recognized that sets of files associated with different computer users may optionally be located in a shared memory of a single computer or shared network drive. The sets of files shown are meant only to be a representative example of files associated with computer users—actual files will, of course, vary in name, location, size, etc.

According to an exemplary embodiment, a table 52 is generated, including a set of attributes for each file in the set of files 50. A table 62 is also generated, including a set of attributes for each file in the set of files 60. The word "table" herein, without limiting its scope, may include a database, index, list, or other equivalent collection or collections of data.

Tables 52 and 62 include, for each file associated respectively with sets of files 50, 60, a set of attributes including username, file or directory name, and checksum. It is of course recognized that the tables 52, 62 may include an alternative or different set of attributes for each file in the sets of files 50, 60. For example, and without meaning to limit the scope of attributes associated with each file, a set of attributes may include an associated user name, a file or directory name, a checksum value, a file location, a file size, a file creation date, a file modification date, a file access date, keywords from the file, and/or names of files located in the same directory.

In one exemplary embodiment, a similarity table 70 is generated utilizing table 52 and table 62 and a predetermined similarity metric. Similarity table 70 is configured to indicate an amount of similarity between files represented in table 52 and files represented in table 62. In one non-limiting example, the similarity metric utilizes a checksum value for each file represented in first table 52 with checksum values for each file represented in second table 62 to generate similarity table 70. The similarity table may then be used to indicate files represented in each table 52, 62 that have an identical checksum—without requiring the files to have any other attributes in common (i.e., multiple files need not share an identical filename to have an identical checksum). For example, similarity table 70 shows a column of unique checksums found in tables 52 and 62. An indication of computer users having a file associated with each unique checksum is also represented in the similarity table 70. Similarity table 70 may optionally indicate whether multiple files having identical checksums are similarly named, located, owned, etc. —depending on the attributes stored in tables 52 and 62. In this manner a computer user may, for example, locate copies of a particular file saved under different names, as is the case for "File X" of user 1 and "File D" of user 2. Additionally, or alternatively, the similarity table may be used indicate the names or usernames of computer users having files with attributes in common, e.g., files having identical checksums.

In an alternative embodiment, the similarity metric is a collection of checksums of portions of first and second files, and if there are a predetermined percentage of portions of the first and second files that are similar based on the associated checksums, the first and second files would be identified as being similar.

Figure 7:
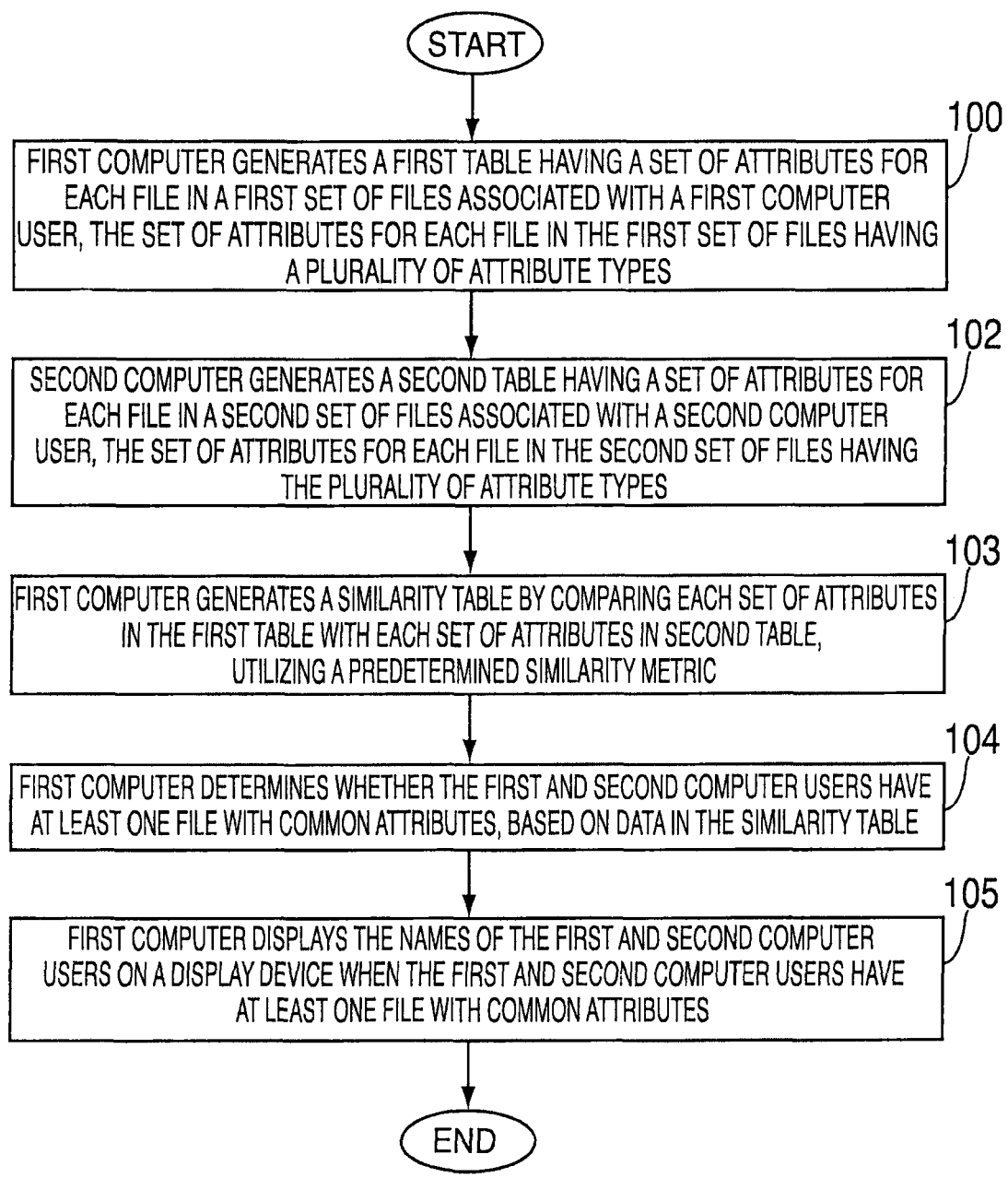
FIG. 7 is a flow chart of a method for identifying computer users having files with common attributes in accordance with another exemplary embodiment.

Referring to FIG. 7, a method for identifying computer users having files with common attributes in accordance with an exemplary embodiment is illustrated. The method can be implemented utilizing the system 9 described above.

At step 100, the computer 20 generates a first table 52 having a set of attributes for each file in a first set of files associated with a first computer user. The set of attributes for each file in the first set of files have a plurality of attribute types.

At step 102, the computer 20 generates a second table 62 having a set of attributes for each file in a second set of files associated with a second computer user. The set of attributes for each file in the second set of files have the plurality of attribute types.

At step 103, the computer 10 generates a similarity table 70 by comparing each set of attributes in the first table 52 with each set of attributes in the second table 62, utilizing a predetermined similarity metric.

At step 104, the computer 10 determines whether the first and second computer users have at least one file with common attributes, based on data in the similarity table 70.

At step 105, the computer 10 displays the names of the first and second computer users on a display device 16 when the first and second computer users have at least one file with common attributes. After step 105, the method is exited.

Referring now to FIGS. 8-12, other exemplary files and tables that can be utilized by the computer network 9 for allowing the identification of computer users having files with common attributes are illustrated. For purposes of discussion, it should be noted that tables of attributes for files associated with different computer users may be generated in a way so as to eliminate or reduce analysis of files that are rarely accessed directly by an average computer user, such as system or application files. In this embodiment, a table 132 is generated at a first time to include attributes for each file or directory in a set of files 130 associated with a first computer user. In a non-limiting example, the third table 132 is generated before the first computer user has created or modified files in the set of files 130. A table 136 is generated at a second, later, time and also includes attributes for each file and/or directory in set of files 134 associated with the first computer user. In one non-limiting example, set of files 134 encompasses the same top-level file structure or directory hierarchy as set of files 130 such that any file in the directory structure that is unchanged between the generation of table 132 and the generation of table 136 will result in an identical set of attributes in both table 132 and table 136. It is, of course, recognized that the file structure associated with a particular set of files may take forms different from the structure illustrated in FIGS. 8-18, and that a computer user will likely have files named or located differently than illustrated, such as directory structures used in operating systems such as MAC OS, UNIX, LINUX, and WINDOWS.

Table 138 is generated from tables 132 and 136 and is configured to include only sets of attributes from table 136 that are not present in table 132. For example, since "System files" appears in both table 132 and 136, it does not appear in the temporal differencing table 138. Also, as illustrated in FIGS. 8-9, at a first time set of files 130 may include a file named "File A", located at the top level of a directory structure (C:\) associated with the first user. The attributes associated with "File A" in table 132, in this example, include the username, filename, and file location within the directory structure. At the time table 136 is generated, "File A" exists in a different location than it did when table 132 was generated. Thus the attributes for "File A" are different in table 136 than in table 132. That difference requires attributes for "File A", to be listed in "temporal difference" table 138.

Referring to FIGS. 13-17, tables 142 and 146 are derived respectively from sets of files 140 and 144 at third and fourth times, respectively. The generation of table 142 at a third time preferably occurs before the second user has created or modified files in the set of files 140 associated with the second computer user. It is however recognized that files may be created or modified in set of files 140, associated with the second user, prior to generation of table 142. The generation of table 146 is preferably occurs later in time than the generation of table 142, though not limited to be so, and the generation of tables 142 and 146 may correspond in time respectively with the generation of tables 132 and 136. A table 148 is generated from table 142 and table 146 to include sets of attributes from table 146 that are not represented in table 142.

A similarity table 150, shown in FIG. 18, is generated utilizing tables 138 and 148 and a predetermined similarity metric. The similarity metric is used to compare each set of attributes in table 138 against each set of attributes in table 148 to determine a degree of similarity of files represented by each set of attributes.

In one non-limiting example, the similarity metric utilizes filename and file location attributes from tables 138 and 148 to determine an amount of similarity between files. For example, FIG. 18, shows attributes for "File C", which, according to table 138 is located at "C:\Project B" for the first user, and according to table 148 is located at "C:\Project B\Project B-1" for the second user. Although the files have a common filename, they are differently located, resulting in, for example, an amount of similarity less than 100%, based on a scale used by the similarity metric. It is, of course, recognized that a variety of scales and similarity determinations may be used by a particular similarity metric.

Referring to FIGS. 19 and 20, it should be noted that similarity table 150 may be used to select attributes of files that match, within a predetermined or selectable amount of similarity, a search attribute entered by a search user. For example, as shown in FIG. 19, a search attribute is received from a search user. According to a non-limiting embodiment of the invention, the search attribute is compared with attributes in the similarity table 150 to produce a result attribute or set of result attributes corresponding with the search attribute. For example, a search user may enter the term "File A". The filename is compared with attributes in similarity table 150 and a set of result attributes is calculated and displayed, including, for example, a list of filenames 164 that are related to the search request "File A." In one exemplary embodiment, the results obtained from the search (shown as Results 1 in FIG. 20) are "File X", "File Y", and "File Z" which are files generated by the search user that are related to the file named "File A." For example, the relationship between the files can be that the "File A", "File X", "File Y", and "File Z" are stored in the same directory. Further, a list of usernames 166 associated with other users who have a file with the filename "File A" is determined and displayed. In one exemplary embodiment, the list of usernames 166 includes a user named "User 2" who has a file named "File A" (shown as Results 2 in FIG. 20). It is, of course, recognized that the search results produced will depend on the type of attributes stored in similarity table 150. It is anticipated that search results may be ordered by amount of similarity to the search term, as well as by other sorting algorithms known to those skilled in the art.

Figure 21:
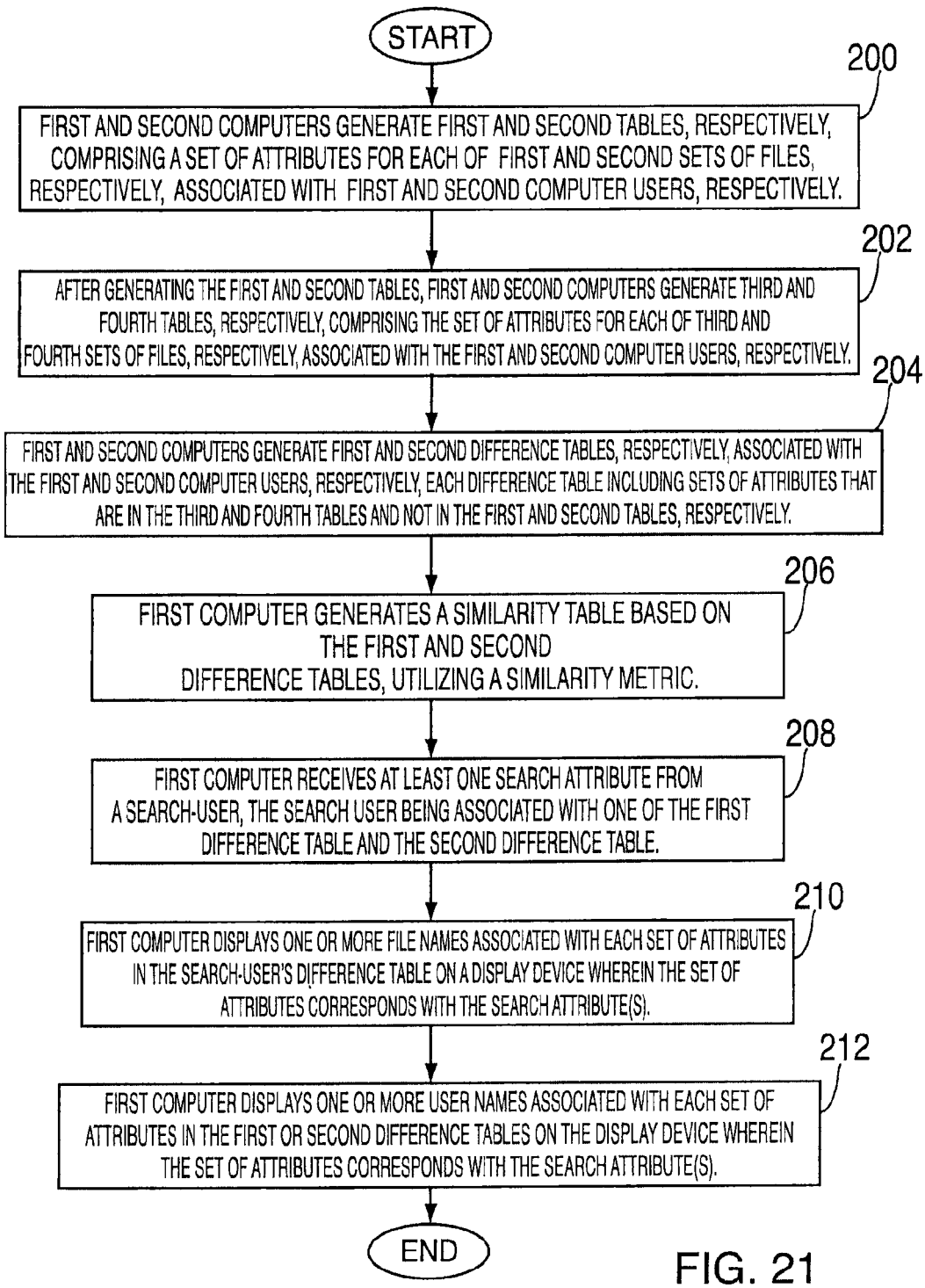
FIG. 21 is a flow chart of a method for identifying intranet users having files with common attributes in accordance with another exemplary embodiment.

Referring now to FIG. 21, a method for identifying computer users having files with common attributes in accordance with another exemplary embodiment is illustrated. The method can be implemented utilizing the system 9 described above.

At step 200, the computers 10 and 20 generate the first table 132 and the second table 142, respectively, comprising a set of attributes for each of first and second sets of files 130, 140, respectively, associated with first and second users, respectively.

At step 202, after generating the first and second tables 132, 142, the computers 10 and 20 generate third and fourth tables 136, 146 comprising a set of attributes for each of a third and fourth set of files, respectively, associated with the first and second computer users, respectively. It should be noted that table 136 can be generated at a different time than generation of table 132. Further, table 146 can be generated at a time different than generation of table 142.

At step 204, computers 10 and 120 generate first and second difference tables 138, 148, respectively, associated with the first and second computers users, respectively. The difference table 138 includes a set of attributes from table 136 that are not included identically in table 132. The difference table 148 includes a set of attributes from table 146 that are not included identically in table 142.

At step 206, the computer 10 generates a similarity table 150 based on the first and second difference tables 138, 148, utilizing a similarity metric. In particular, the computer 10 compares sets of attributes in table 138 with sets of attributes in table 148, utilizing a predetermined similarity metric to generate the similarity table 150.

At step 208, the computer 10 receives at least one search attribute from a search user. The search user can be either the first user or the second user. The search attribute corresponds to an attribute type contained in similarity table 150.

At step 210, the computer 10 displays one or more filename(s) associated with each set of attributes in the search-user's difference table on the display device 16 wherein the set of attributes corresponds with the search attribute.

At step 212, the computer displays one or more username(s) associated with each set of attributes in the first or second difference tables on the display device 16 wherein the set of attributes corresponds with the search attribute. After step 212, the method is exited.

It should be noted that in an alternate embodiment, an inferred relationship metric could be utilized to find files of first and second users having common attributes. An inferred relationship metric is a metric associated with an organization of files. For example, an inferred relationship metric could be a grouping of files in a folder. Further, for example, if User 1 and User 2 have "File Z" in common, the fact that User 2 also places "File C" and "File H" in the same folder as "File Z" may suggest an inferred relationship between "File C," "File H," and "File Z."

It is of course appreciated that the foregoing embodiments may be extended without limitation to generate table and results associated with sets of files associated with more than two computer users within a computer network. It should be noted that in an alternative embodiment, the foregoing tables and results can be determined utilizing a third external computer or computer server, communicating with first and second computers that store the files associated with first and second computer users, respectively.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The system and methods for identifying computer users having files with common attributes provide a substantial advantage over other systems and methods. In particular, the system and methods provide a technical effect of enabling intranet users to find file resources in an intranet which are not otherwise sufficiently available, utilizing a similarity table which relates attributes of a file to the attributes of another file. Another effect of the system and the methods are that computer users are able to identify other computer users having similar files.

While the invention is described with reference to an exemplary embodiment, it will be understood by those skilled in the art that various changes may be made and equivalent elements may be substituted for elements thereof without departing from the scope of the invention. In addition, many modifications may be made to the teachings of the invention to adapt to a particular situation without departing from the scope thereof. Therefore, is intended that the invention not be limited the embodiment disclosed for carrying out this invention, but that the invention includes all embodiments falling with the scope of the intended claims. Moreover, the use of the term's first, second, etc. does not denote any order of importance, but rather the term's first, second, etc. are used to distinguish one element from another.

What is claimed is:

1. A method for identifying computer users having files with common attributes, comprising:

generating a first table having a set of attributes for each file in a first set of files associated with a first computer user, the set of attributes for each file in the first set of files having a plurality of attribute types;

generating a second table having a set of attributes for each file in a second set of files associated with a second computer user, the set of attributes for each file in the second set of files having the plurality of attribute types;

generating a similarity table by comparing each set of attributes of files represented in the first table with each set of attributes of files represented in the second table, utilizing a predetermined similarity metric to determine an amount of similarity between files represented in the first table and the second table, wherein the amount of similarity is a percentage ranging from zero to one hundred percent;

determining whether the first and second computer users have at least one file with common attributes, based on data in the similarity table;

receiving a first file attribute that corresponds with a first file associated with the first computer user;

indicating a name of the second computer user associated with the second set of files wherein at least one file in the second set of files corresponds to the first file, utilizing the similarity table; and indicating one or more related files that are associated with the second computer user, wherein the related files are determined to correspond to the first file by utilizing a predetermined inferred relationship metric.

2. The method of claim 1, wherein the first and second sets of files are stored on first and second computers, respectively.

3. The method of claim 1, further comprising:

generating a third table at a first time having a set of attributes for each file in a third set of files associated with the first computer user, the set of attributes for each file in the third set of files having the plurality of attribute types;

generating a fourth table at a second time after the first time having a set of attributes for each file in a fourth set of files associated with the first computer user, the set of attributes for each file in the fourth set of files having the plurality of attribute types;

generating a fifth table at a third time having a set of attributes for each file in a fifth set of files associated with the second computer user, the set of attributes for each file in the fifth set of files having the plurality of attribute types; and generating a sixth table at a fourth time after the third time having a set of attributes for each file in a sixth set of files associated with the second computer user, the set of attributes for each file in the sixth set of files having the plurality of attribute types;

wherein the first table consists of sets of attributes contained in the fourth table that are not contained in the third table and the second table consists of sets of attributes contained in the sixth table that are not contained in the fifth table.

4. A computer program product for identifying computer users having files with common attributes, the computer program product comprising a non-transitory computer readable storage medium having computer readable program code embodied therewith, the computer readable program code comprising computer readable program code configured to:

generate a first table having a set of attributes for each file in a first set of files associated with a first computer user, the set of attributes for each file in the first set of files having a plurality of attribute types;

generate a second table having a set of attributes for each file in a second set of files associated with a second computer user, the set of attributes for each file in the second set of files having the plurality of attribute types;

generate a similarity table by comparing each set of attributes of files represented in the first table with each set of attributes of files represented in the second table, utilizing a predetermined similarity metric to determine an amount of similarity between files represented in the first table and the second table, wherein the amount of similarity is a percentage ranging from zero to one hundred percent;

determine whether the first and second computer users have at least one file with common attributes, based on data in the similarity table;

receive a first file attribute that corresponds with a first file associated with the first computer user;

indicate a name of the second computer user associated with the second set of files wherein at least one file in the second set of files corresponds to the first file, utilizing the similarity table; and indicate one or more related files that are associated with the second computer user, wherein the related files are determined to correspond to the first file by utilizing a predetermined inferred relationship metric.

5. The computer program product of claim 4, wherein the first and second sets of files are stored on first and second computers, respectively.

6. The computer program product of claim 4, wherein computer readable program code is further configured to:

generate a third table at a first time having a set of attributes for each file in a third set of files associated with the first computer user, the set of attributes for each file in the third set of files having the plurality of attribute types;

generate a fourth table at a second time after the first time having a set of attributes for each file in a fourth set of files associated with the first computer user, the set of attributes for each file in the fourth set of files having the plurality of attribute types;

generate a fifth table at a third time having a set of attributes for each file in a fifth set of files associated with the second computer user, the set of attributes for each file in the fifth set of files having the plurality of attribute types; and generate a sixth table at a fourth time after the third time having a set of attributes for each file in a sixth set of files associated with the second computer user, the set of attributes for each file in the sixth set of files having the plurality of attribute types;

wherein the first table consists of sets of attributes contained in the fourth table that are not contained in the third table and the second table consists of sets of attributes contained in the sixth table that are not contained in the fifth table.

7. A system for identifying computer users having files with common attributes, comprising:

first and second computers operably communicating with one another;

a display device operably communicating with the first computer, the first computer configured to generate a first table having a set of attributes for each file in a first set of files associated with a first computer user, the set of attributes for each file in the first set of files having a plurality of attribute types;

the second computer further configured to generate a second table having a set of attributes for each file in a second set of files associated with a second computer user, the set of attributes for each file in the second set of files having the plurality of attribute types;

the first computer further configured to generate a similarity table by comparing each set of attributes of files represented in the first table with each set of attributes of files represented in the second table, utilizing a predetermined similarity metric to determine an amount of similarity between files represented in the first table and the second table, wherein the amount of similarity is a percentage ranging from zero to one hundred percent;

the first computer further configured to determine whether the first and second computer users have at least one file with common attributes, based on data in the similarity table;

the first computer further configured to display a user identifier associated with at least one of the first and second computer users on the display device when the first and second computer users have at least one file with common attributes;

receive a first file attribute that corresponds with a first file associated with the first computer user;

indicate a name of the second computer user associated with the second set of files wherein at least one file in the second set of files corresponds to the first file, utilizing the similarity table; and indicate one or more related files that are associated with the second computer user, wherein the related files are determined to correspond to the first file by utilizing a predetermined inferred relationship metric.

8. The system of claim 7, wherein the first and second sets of files are stored on the first and second computers, respectively.

* * * * *